(12) United States Patent
Iarocci et al.

(10) Patent No.: US 8,990,273 B2
(45) Date of Patent: Mar. 24, 2015

(54) AD HOC FILE SHARING

(75) Inventors: John Joseph Iarocci, Los Gatos, CA (US); Christopher Scott Linn, Palo Alto, CA (US); Marc Jason Krochmal, Santa Clara, CA (US); Keith Stattenfield, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 398 days.

(21) Appl. No.: 13/006,378

(22) Filed: Jan. 13, 2011

(65) Prior Publication Data

US 2012/0185520 A1 Jul. 19, 2012

(51) Int. Cl.
*G06F 17/30* (2006.01)
*H04L 29/08* (2006.01)

(52) U.S. Cl.
CPC .............. *H04L 67/06* (2013.01); *H04L 67/16* (2013.01); *H04L 67/141* (2013.01)
USPC ........... 707/827; 455/403; 370/646; 709/201; 709/217; 709/220; 709/230

(58) Field of Classification Search
CPC ... H04L 67/104; H04L 63/10; H04L 67/1068; H04L 67/00; G06F 17/30165; H04W 4/206; H04W 48/16; H04W 4/008
USPC ........... 707/827; 455/403; 370/646; 709/201, 709/217, 220, 230
See application file for complete search history.

(56) References Cited

U.S. PATENT DOCUMENTS

| | | | |
|---|---|---|---|
| 6,842,460 B1 * | 1/2005 | Olkkonen et al. | 370/465 |
| 2002/0184310 A1 * | 12/2002 | Traversat et al. | 709/204 |
| 2003/0055898 A1 * | 3/2003 | Yeager et al. | 709/205 |
| 2003/0236890 A1 | 12/2003 | Hurwitz et al. | |
| 2004/0019641 A1 | 1/2004 | Bartram et al. | |
| 2004/0103280 A1 | 5/2004 | Balfanz et al. | |
| 2004/0203381 A1 * | 10/2004 | Cahn et al. | 455/41.2 |
| 2005/0091289 A1 * | 4/2005 | Shappell et al. | 707/201 |
| 2006/0039303 A1 | 2/2006 | Singer et al. | |
| 2006/0094456 A1 * | 5/2006 | Rittle et al. | 455/519 |
| 2006/0133407 A1 * | 6/2006 | Kuisma | 370/447 |
| 2007/0179948 A1 | 8/2007 | Jennings, III | |
| 2007/0236727 A1 * | 10/2007 | Proust et al. | 358/1.15 |
| 2008/0096544 A1 * | 4/2008 | McNamara et al. | 455/424 |
| 2009/0017799 A1 * | 1/2009 | Thorn | 455/414.1 |
| 2009/0215398 A1 | 8/2009 | Adler et al. | |
| 2009/0215477 A1 * | 8/2009 | Lee et al. | 455/466 |
| 2010/0257251 A1 * | 10/2010 | Mooring et al. | 709/216 |
| 2010/0325238 A1 * | 12/2010 | Khedouri et al. | 709/217 |
| 2011/0081923 A1 * | 4/2011 | Forutanpour et al. | 455/457 |

OTHER PUBLICATIONS

Dejan Milojicici et al., "Appliance Aggregation Architecture (A3)", dejan@hpl.hp.com, Mobile and Media Systems Laboratory, HP Laboratories Palo Alto, HP Laboratories Palo Alto, Jul. 3, 2003, 11 pages.

(Continued)

*Primary Examiner* — Dennis Truong
(74) *Attorney, Agent, or Firm* — Park, Vaughan, Fleming & Dowler LLP

(57) ABSTRACT

A method and apparatus of a device that transfers files and performs file browsing using an ad hoc file sharing service is described. In an exemplary method, the device transmits an advertisement of the ad hoc file sharing service to each of one or more of other devices. The transmitted advertisements each include a user identity of the user associated with the first device. Furthermore, access to the ad hoc file sharing service is granted on a per-user basis. The device establishes a connection with each of the other devices and transfers files with each of the plurality of other devices.

21 Claims, 16 Drawing Sheets

(56) References Cited

OTHER PUBLICATIONS

PCT International Search Report and Written Opinion for PCT International Appln No. PCT/US2012/021073 mailed May 23, 2012. (15 pages).

Stephen Voida, "Share and Share Alike: Exploring the User Interface Affordances of File Sharing", ACM, 2 Penn Plaza, Suite 701, New York, USA, Apr. 27, 2006.

\* cited by examiner

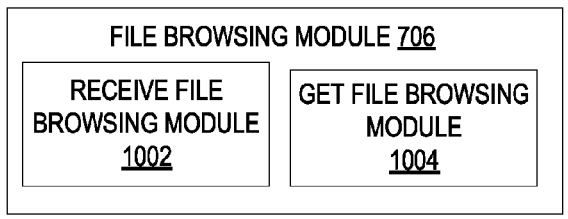
FIGURE 10A
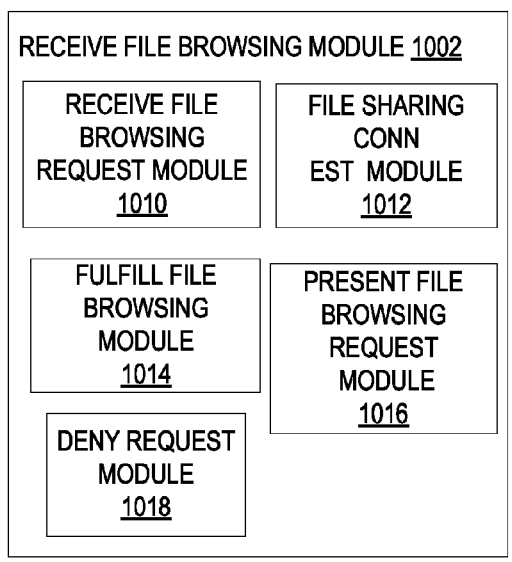
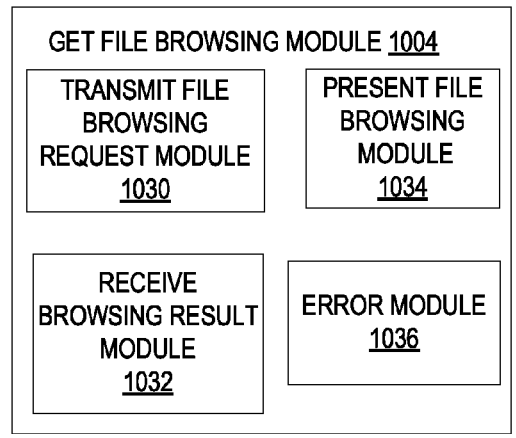
FIGURE 10B
FIGURE 10C

AD HOC FILE SHARING

FIELD OF INVENTION

This invention relates generally to file sharing and browsing and more particularly to file sharing and browsing on an ad hoc basis.

BACKGROUND OF THE INVENTION

File sharing is the use of distributing and/or providing access to files stored on a computer or other device. File sharing can be performed by client computers accessing files on a central server, establishing peer-to-peer file sharing between computers with a third party service, placing the files to be shared on removable media and moving this media between computers, etc. One particular use of file sharing is to share files on an ad hoc basis, which is sharing files for a particular purpose or task. For example, it can be useful to setup temporary file sharing between participants in a meeting.

However, as useful as file sharing is between two computers, it can be difficult for an average user to adequately set up ad hoc file sharing on their computer. For example, ad hoc file sharing may require the participating computers to be on the same Wi-Fi network, a person may need to enable file sharing, setup file permission, etc. The more steps that are required to setup ad hoc file sharing, the less likely a computer user will take advantage of this type of file sharing.

SUMMARY OF THE DESCRIPTION

A method and apparatus of a device that transfers files and performs file browsing using an ad hoc file sharing service is described. In an exemplary method, a first device transmits an advertisement of the ad hoc file sharing service to each of one or more other devices. The transmitted advertisements each include a user identity of the user associated with the first device. Furthermore, access to the ad hoc file sharing service is granted on a per-user basis. The first device can establish a connection with each of the plurality of other devices and can transfer files with each of the plurality of other devices.

In a further embodiment, a device transmits an advertisement of an ad hoc file sharing service to each of the plurality of other devices, where the advertisement includes a user identity of the user associated with the first device. Furthermore the device allows access to the ad hoc file sharing service to each of the plurality of other devices, where access to the ad hoc file sharing service is granted on a per-user basis. In addition, the access is accomplished without a user corresponding to the each of the plurality other devices having a file sharing account on the first device.

In one embodiment, an ad hoc file sharing process can be initiated on a first device in response to a user selecting or opening a folder or icon designated or configured for ad hoc file sharing. The act of selecting or opening the folder or icon automatically enables the ad hoc file sharing process which can include transmitting advertisements of the ad hoc file sharing service to each of one or more other devices. The advertisements can include a user identity of the user associated with the first device or a device identity of the first device or both user identity and device identity. Access on each device can be granted on a per-user basis, and access can be accomplished without requiring a user of the other device to set up file sharing before the advertisement is received.

Other methods and apparatuses are also described.

BRIEF DESCRIPTION OF THE DRAWINGS

The present invention is illustrated by way of example and not limitation in the figures of the accompanying drawings in which like references indicate similar elements.

FIGS. 10A, 10B, and 10C are block diagrams of file browsing modules that browse files using the ad hoc file sharing service.

DETAILED DESCRIPTION

A method and apparatus of device transfers files and performs file browsing using an ad hoc file sharing service is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that transfers files and performs file browsing using an ad hoc file sharing service is described. In an exemplary method, the device transmits an advertisement of the ad hoc file sharing service to each of one or more of other devices. The transmitted advertisements each include a user identity of the user associated with the first device. Furthermore, access to the ad hoc file sharing service is granted on a per-user basis. The device establishes a connection with each of the other devices and transfers files with each of the plurality of other devices.

Figure 1:
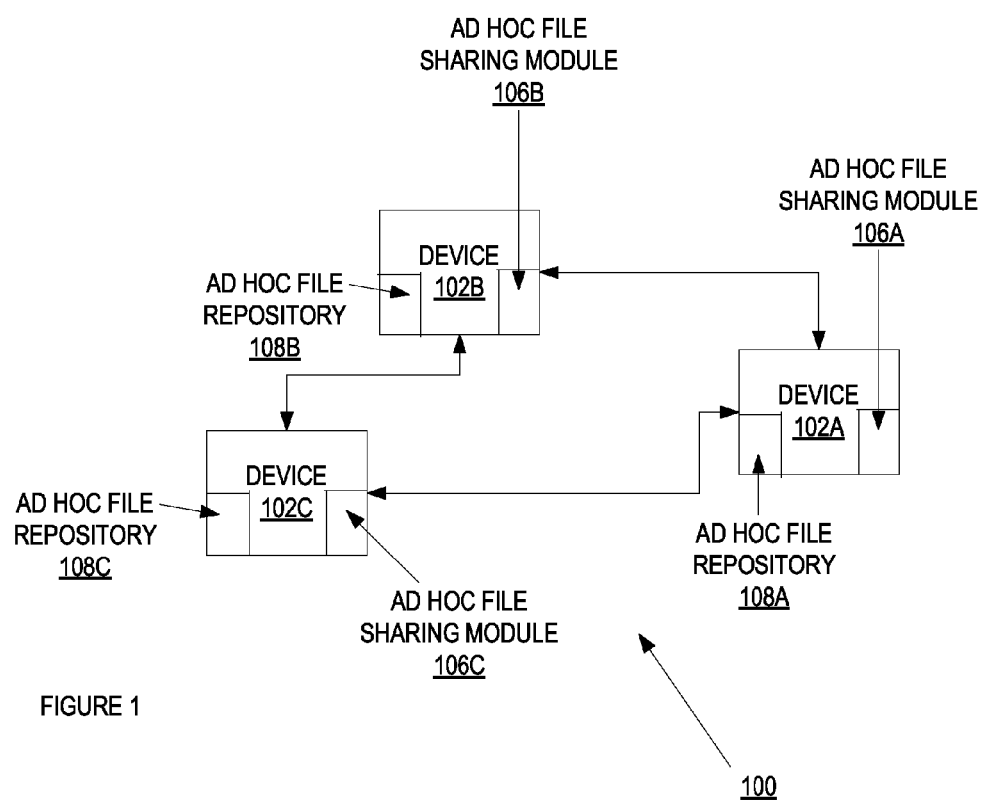
FIG. 1 is a block diagram of one embodiment of multiple devices participating in ad file sharing.

FIG. 1 is a block diagram of one embodiment of multiple devices participating in ad file sharing. In FIG. 1, devices 102A-C are coupled via network connections 104A-C. In one embodiment, device 102A is coupled to device 102B be via a network connection 104A, and device 102B is coupled to device 102C via network connection 104B. Similarly, device 102C is coupled to device 102A via network connection 104C. While in one embodiment, the three devices are illustrated coupled together via network connections, in alternate embodiments, there can be more or less devices coupled together via network connections in a full mesh of point-to-point network connections and/or a network topology of network connections that is less than a full mesh. For example and in one embodiment, a ring of network connections can be used for a group of four or more devices.

In one embodiment, a device can be a personal computer, laptop, notebook, tablet, smartphone, cellular telephone, gaming device, media player, etc., and/or any other type of device that can have a network connection and can store and/or transfer files. In one embodiment, a network connection can be any type of network connection that can couple two different devices: a wireless connection (Wi-Fi, cellular, Bluetooth, infrared etc.), wired (Ethernet, etc.), and/or a combination therein. In one embodiment, each device 102A-C can transfer files and/or browse files in other device filesystems using an ad hoc file sharing service. In one embodiment, each device 102A-C stores files that are available to other devices 102A-C via the ad hoc file sharing service in a special folder, which can alleviate the need for a user to manually set permissions for which files are available and/or not available for sharing, or to mount special file systems. In this case, a user can place a file (or an alias or shortcut of the file) in the special folder and automatically allow file sharing of that file by placing the file into that special folder. The special folder can be designated or configured to receive files that a user wants to share through an embodiment of the ad hoc filing sharing described herein. The act of selecting or opening the folder or associating or placing a file into that folder can automatically enable ad hoc file sharing for that file and any other file placed into or associated with that folder. The file, or an alias or shortcut for the file, can be placed into or associated with that folder in order to enable ad hoc file sharing for that file. The special folder can be used to limit the extent of files that are shared in that, in one embodiment, only those files placed into or associated with the special folder are made available for ad hoc file sharing.

In one embodiment, the ad hoc file sharing service is a point-to-point file sharing service that can be set up for a particular task, project, and/or other need. In one embodiment, the ad hoc file sharing service works by transmitting advertisements to the other devices that can participate in the ad hoc file sharing service of that device. In this embodiment, the transmitted advertisements signify to other devices that an ad hoc file sharing service is available in one of the devices. By having the point-to-point service, a first user of a first device can allow access to second user of a second device without having the second user have an account on the first device for a file sharing service or without the need for a third party server and/or service that is hosted on a third device (e.g., peer-to-peer file sharing, etc.). Furthermore, in one embodiment, access to the ad hoc file sharing service is granted on a per user basis. Thus, in this embodiment, the ad hoc file sharing service allows a user who does not have an account specific access to the ad hoc file sharing service that may not be granted to another user. This is in contrast to different type of file sharing service that may have a guest account access that grants file sharing access to any and all remote users. In addition, access to the ad hoc file sharing can be accomplished without use of an authentication service that grants access for a remote device to the ad hoc file sharing service.

In one embodiment, the ad hoc file sharing service works by one device transmitting advertisements to other devices to advertise the existence of a file sharing service on that device over the networking connections that each of the devices 104A-C participate in. For example and in one embodiment, the device 102A transmits advertisements over its network connections 104A-C. In one embodiment, one or more devices 102A-C transmits advertisement of the ad hoc file sharing service on network connections that the device participates in (e.g., broadcast on a corporate local area network (LAN), home network LAN, etc. (e.g., broadcasts advertisements to all other devices on network connections 104 A-C). In another embodiment, device wanted 102A-C transmit just the advertisements to the device to other devices within a close proximity to that device 102A-C. In this embodiment, if the device 102A-C would transmit the advertisements to other devices within a close proximity to the transmitting device. For example in one embodiment, the device 102A transmits advertisements to the other devices 102B-C that are in close proximity as measured based on Wi-Fi, Bluetooth, and/or cellular signal strength, routing hops, physical location of the device 102A-C (Global Positioning System locations, cellular telephone locations, etc), etc. and/or combinations therein. For example and in one embodiment, the signal strength of a Bluetooth signal can be used to limit the number Wi-Fi discovered devices.

In one embodiment, the ad hoc file sharing services in devices 102A-C browses for and transfers files over a file sharing connection. In one embodiment, a file sharing connection means that one device can browse files of a remote device, and transfer files to and from that remote device without granting further access to the ad hoc file sharing service running on the one device. In this embodiment, this means that the one or more files and/or directories in the file sharing repository are visible to the remote device through the ad hoc file sharing service. In one embodiment, the ad hoc file sharing service grants access to a remote device when a remote device initially attempts to browse and/or transfer files to a device hosting this ad hoc file sharing service. Granting of access is further described in FIGS. 4A and 5A below.

In one embodiment, the ad hoc file sharing services in devices 102A-C controlled by an ad hoc fileserver see sharing service module 106A-C. In this embodiment, the ad hoc file search sharing service module 106A-C controls the enabling of this file sharing service, brings up the relevant networks services and connections to support the ad hoc file sharing service (e.g., brings up Wi-Fi, Bluetooth, etc.), and controls the transfer and/or browsing of the files that are accessible by the ad hoc file sharing service. The operations of the ad hoc file sharing service module are further described in FIG. 2 below.

Furthermore, each device 102A-C includes an ad hoc file repository 108A-C. In one embodiment, the file repository 108A-C for the ad file sharing service is a directory, a separate file system, detachable storage, internal memory, etc. and/or any component of a device that can be used to store files. Note that there is no requirement for this invention to have a separate file system to support the ad hoc file sharing service. In one embodiment, the ad hoc file sharing service designates a folder entitled meeting room as the temporary storage of the files to be used for the ad hoc file sharing service.

Figure 2:
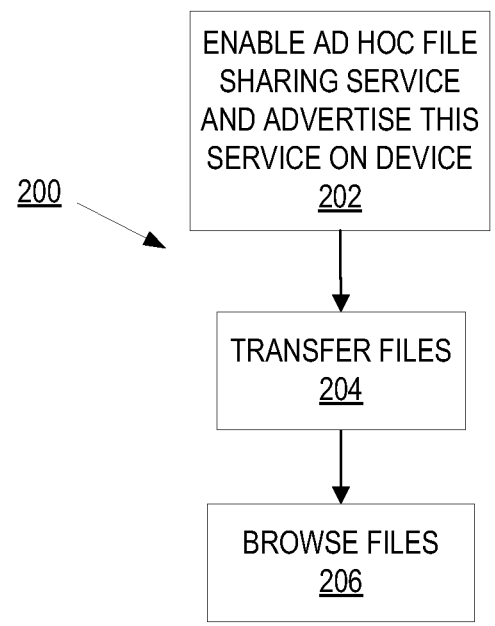
FIG. 2 is a flow diagram of one embodiment of a process to perform ad hoc file sharing.
Figure 3A:
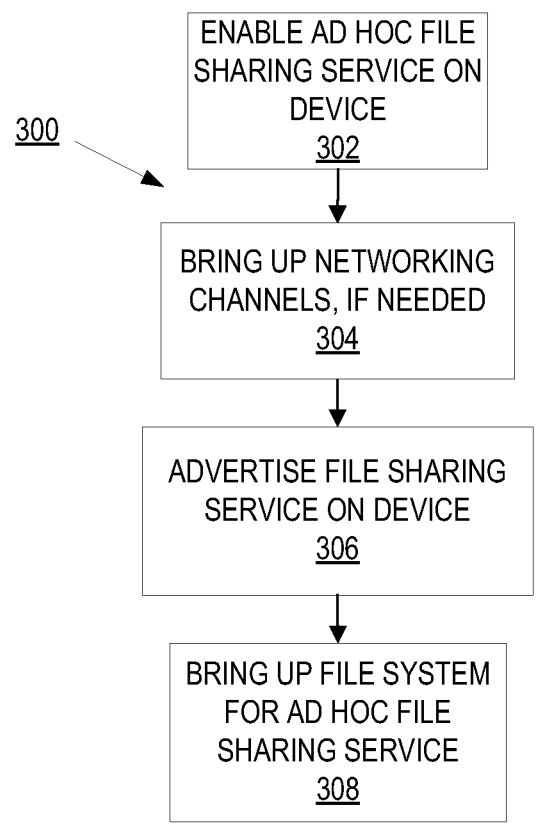
FIG. 3A is a flow diagram of one embodiment of a process to enable and advertise an ad hoc file sharing service.

FIG. 2 is a flow diagram of one embodiment of a process to perform ad hoc file sharing. In FIG. 2, process 200 begins by enabling the ad hoc file sharing service and advertising the existence of this service at block 202. In one embodiment, process 200 enables the ad hoc file sharing service to by bringing up the process that controls the ad hoc file sharing service. In this embodiment by enabling the ad hoc file sharing service. For example and in one embodiment, a user of the device can turn on the ad hoc file sharing service and can use the service to send and/or receive files with another device and also browse remote devices and have remote devices browse that device. In this example, the user of the device can turn on and off the service as need be. For example and in one embodiment, a user can turn on the service if in a meeting in which the user would like to share files other people in the meeting. Upon completion of the meeting, the user can turn off the service, thereby disallowing file sharing with the ad hoc file sharing service. In another embodiment, process 200 can enable the ad hoc file sharing service for a period of time (e.g., no more than one hour or some other time period). In this embodiment, process 200 would turn off the ad hoc file sharing service at the expiration of that time period. In another embodiment, process 200 enables the ad hoc file sharing service. In one embodiment, process 200 enables the ad hoc file sharing service when a user clicks on the icon representing this service in a UI. For example and in one embodiment, by clicking on the meeting room icon in the file browsing user interface as described in FIG. 6 below can enable the ad hoc file sharing service. Furthermore, process 200 advertises the existence of the ad hoc file sharing service to other devices. Enabling an advertisement of the ad hoc file sharing services described in further described in FIG. 3 below.

At block 204, process 200 transfers files between the device running process 200 and other remote devices. For example and in one embodiment, process 200 can transfer and receive files on using a protocol such as secure hypertext transfer protocol (HTTPS). In alternate embodiments, process 200 can use other file transfer protocol as known in the art to transfer files (e.g., file transfer protocol (FTP), hypertext transfer protocol (HTTP), Server Message Block (SMB), Apple Filing Protocol (AFP) etc.). Transferring of files is further described in FIGS. 4A-B below.

At block 206, process 200 browses the files available for browsing between the device running process 200 and other remote devices. For example and in one embodiment, process 200 can request a listing of files and/or directories and receive a similar such requests by using the HTTPS protocol. In alternate embodiments, process 200 can use other protocols as known in the art to send and receive file browsing request (e.g., FTP, HTTP, SMB, AFP, etc.). File browsing is further described in FIGS. 5A-B below.

FIG. 3 is a flow diagram of one embodiment of a process 300 to enable and advertise the ad hoc file sharing service. In FIG. 3, process 300 begins by enabling the ad hoc file sharing service at block 302. In one embodiment, process 300 launches the process that controls the ad hoc file sharing service. Once launched, the device running the process 300 will be able to transmit, receive, and fulfill file transfer and file browsing requests. In one embodiment, process 300 enables the ad hoc file sharing service. While in one embodiment, process 300 enables this service by clicking on an icon representing the service in a user interface, such as the meeting room icon as described in FIG. 6 below.

Process 300 brings up the relevant networking services, if needed, at block 304. In one embodiment, process 300 can bring up Wi-Fi, Bluetooth, cellular data, infrared, wired networking (Ethernet, etc.), and/or a combination therein. While in one embodiment, process 300 brings up all of the possible networking services at block 304, in alternate embodiments, process 300 brings one or some of the network services (e.g., process 300 brings up Wi-Fi, or Wi-Fi and Bluetooth). In this alternate embodiment, which networking services process 300 brings up is controlled by a configuration file and/or parameter(s). In a further embodiment, process 300 brings up the networking services that process 300 detects that are in close proximity. For example and in one embodiment, process 300 detects a Wi-Fi network from a LAN (e.g., a Wi-Fi access point that advertises that LAN is available) and brings up the Wi-Fi networking service on the device, so that the device can automatically connect with that LAN. Alternatively, process 300 could detect another device advertising having a possible point-to-point networking service (Wi-Fi point-to-point or ad hoc Wi-Fi, Bluetooth, infrared, etc.) and brings up the relevant networking service, so that the device can automatically connect with the other device to create a point-to-point networking connection. For example and in one embodiment, process 300 detects another device advertising Wi-Fi service, and process 300 brings up the Wi-Fi service on the device executing process 300.

At block 306, process 300 advertises the existence of the ad hoc file sharing service. In one embodiment, process 300 transmits advertisement packets on the network connections that device has configured. In one embodiment, the ad hoc file sharing service uses the Bonjour service discovery protocol to advertise the ad hoc file sharing service to other devices over the available network connections. For example and in one embodiment, device 102A uses the Bonjour service discovery protocol to advertise the ad hoc file sharing service to devices 102B-C using network connections 104A and 104C, respectively. Other types of advertisements as known in the art can be used to advertise the existence of the ad hoc file sharing service (unicast, broadcast, multicast advertisements, etc.).

In one embodiment, the advertisement packets include an identification of the user associated with the ad hoc file sharing service being advertised. For example and in one embodiment, process 300 includes an identification of the user, such as an email address, AppleID, MobileMe ID, social network identification, a hash of the such an identifier (e.g., secure hash algorithm (SHA)-1 or other hash algorithm known in the art, etc.), a number used as a key, a readable name (e.g., first name, last name, and/to a combination therein, etc.), a universally unique identifier (UUID) (e.g., a number used as a key that is globally unique), a certificate "fingerprint" (e.g., a number hash associated with an X509 certificate), a telephone number, etc. Furthermore, the user identification can be a list of identifiers known for that user (e.g., multiple identifiers of the same and/or different type, etc.). In one embodiment, if a hash of an identification is used, the device receiving the advertisement would use a similar hash on a set of known identifications (e.g., known emails addresses, social networking identifications, etc.) to match the identification data that is stored in the advertisement. This embodiment allows the advertisements to be transmitted without the email address or other identification being sent in the clear. In another embodiment, the certificate "fingerprint" is a variation on a number used as a key, with the additional semantic being uniquely associated with the user's certificate, which may be additionally be used for encrypting a secure file transfer.

Figure 3B:
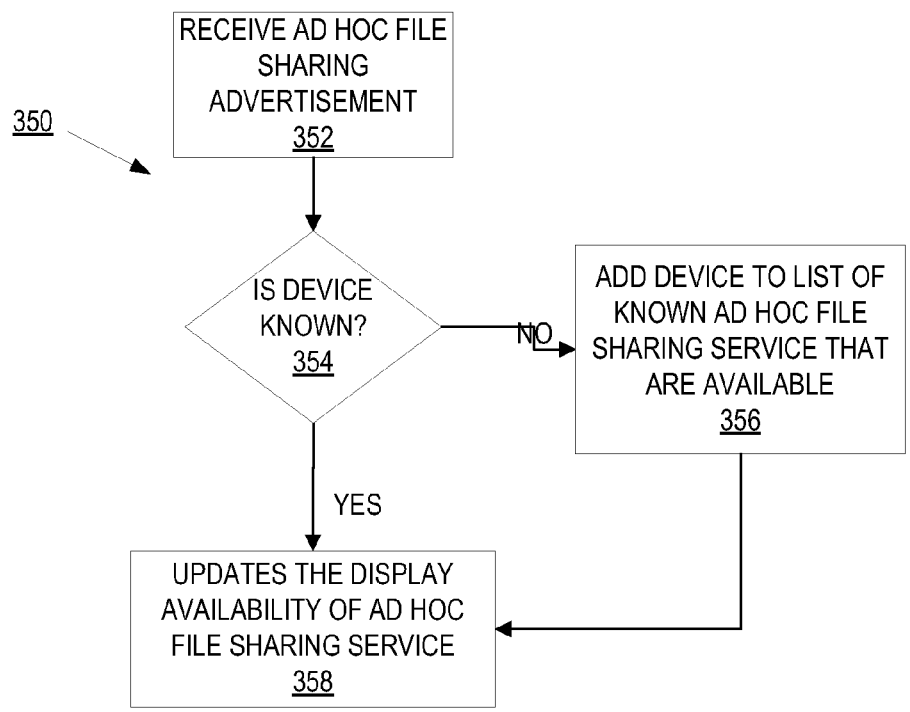
FIG. 3B is a flow diagram of one embodiment of a process to receive advertisements from an ad hoc file sharing service.

FIG. 3B is a flow diagram of an embodiment of a process 350 that receives an ad hoc file sharing service advertisement. In FIG. 3B, process 350 begins by receiving an ad hoc file sharing service advertisement at block 352. In one embodiment, an ad hoc file sharing advertisement is an indication of the availability an ad hoc file sharing service from the device that sent the advertisement. Furthermore, in one embodiment, the advertisement packets include an identification of the user associated with the ad hoc file sharing service being advertised as described above.

At block 354, process 350 determines if the device sending the advertisement is known to the device executing process 350. In one embodiment, process 350 maintains a list of devices known to have an ad hoc file sharing service that is available. If the ad hoc file sharing service is not known, process 350 adds the device to the list of known devices with available ad hoc file sharing services at block 356. In one embodiment, existence of a remote device with an available ad hoc file sharing service does not necessarily mean that a file sharing connection has been established. In this embodiment, a file sharing connection can be established by an attempt to transfer and/or brose files using the ad hoc file sharing service of the remote device. Establishing of a file sharing connection is further described in FIGS. 4A and 5A below. Execution of process 350 proceeds to block 358.

If the device sending the advertisement is known to the device executing process 350, process 350 updates the display the availability of the ad hoc file sharing service at block 358. In one embodiment, process 350 displays the availability of a remote ad hoc file sharing service in a UI as described in FIG. 6 below.

Figure 4A:
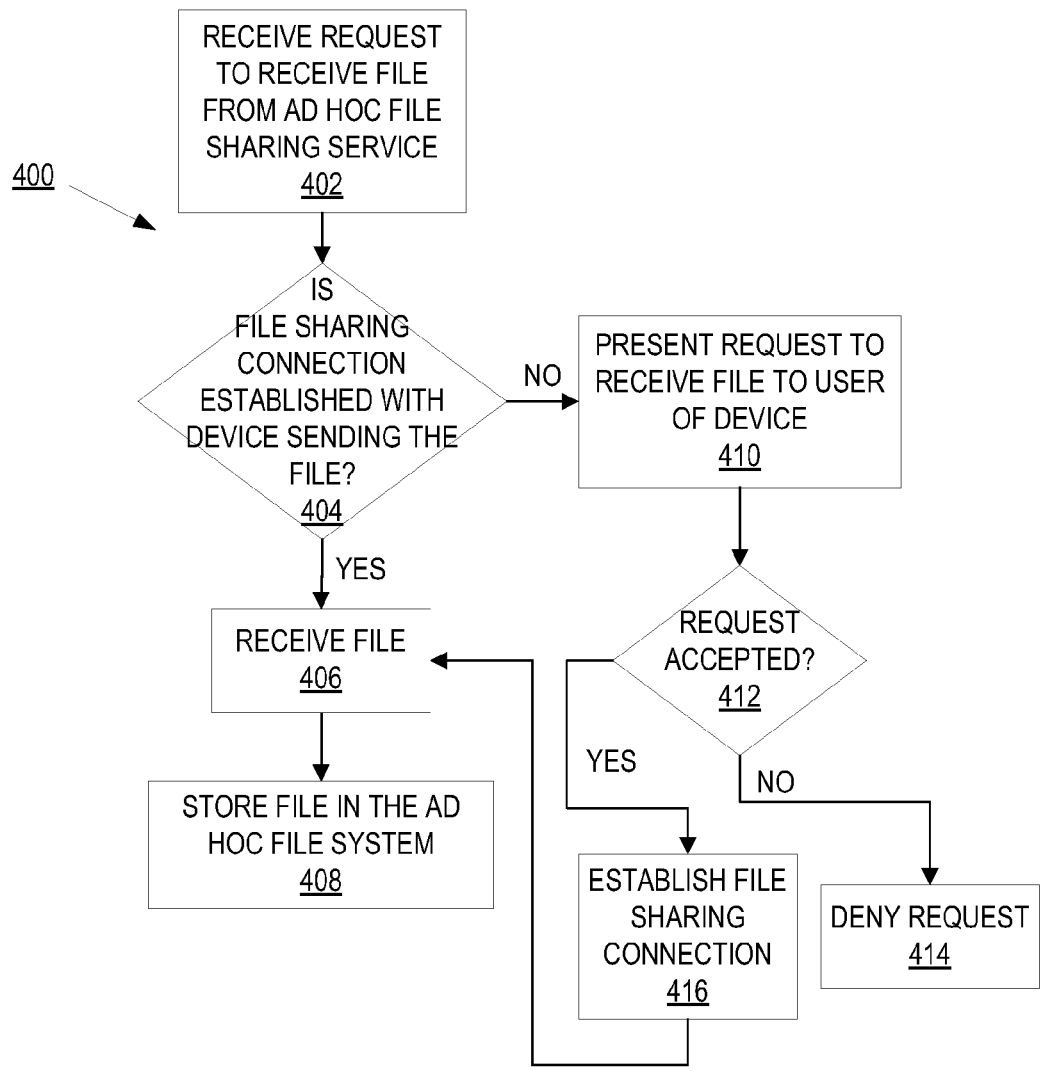
FIGS. 4A and 4B are flow diagrams of one embodiment of processes to transfer files using the ad hoc file sharing service.

As described above, the ad hoc file sharing service is used to transfer files between different devices. FIG. 4AB are flow diagrams of embodiments of processes to transfer files using the ad hoc file sharing service. In particular, FIG. 4A is a flow diagram of one embodiment of a process 400 to receive a file using the ad hoc file sharing service. FIG. 4A begins by process 400 receiving a request to receive a file from an ad hoc file system at block 402. In one embodiment, process 400 receives HTTPS request to a send of file to the device that is executing process 400. Alternatively, process 400 can receive another type of file transfer request known in the art (FTP, HTTP, etc.) For example and in one embodiment, a process 400 receives an HTTPS request that identifies the file and an identification of a sending device that wishes to transmit the file. As described above, the identification can be an email address, social network identification, outside service identification (e.g., Twitter identification, Apple ID, MobileMe ID, or some other known service identification, etc.), and/or a hash of such an identification, etc.

At block 404, process 400 determines if there is a file sharing connection established with the device requesting to send the file. In one embodiment, a file sharing connection is an established connection, where the user of a first device has allowed another user to access the ad hoc file sharing service. By establishing this file sharing connection between the two devices, the point-to-point nature of the file sharing is established. In this embodiment, once the initial user has given permission to the other user to access the ad hoc file sharing service of the first device, the other user can view, retrieve, and/or send files to the first device. While in one embodiment, access to the ad hoc file sharing is granted one-way, in alternate embodiments, access can be automatically be granted to the reverse direction once access to one way (e.g., once user A grants permission to user B to retrieve, and/or send files to the device of user A, access to user A to retrieve, and/or send files to the device of user 8 is granted). In one embodiment, process 400 looks up identification associated with the ad hoc file sharing service to determine if the device associated with that identification has established a file sharing connection. The identification can be an email address, social network identification, outside service identification (e.g., Twitter identification, Apple ID, MobileMe ID, or some other known service identification, etc.), etc. Furthermore, in one embodiment, the identification can be hash of the identification listed above (e.g., Secure Hash Algorithm (SHA)-1, etc.).

If process 400 has determined that no file sharing connection has been established with the device requesting to send the file, at block 410, process 400 presents the request to receive the file to the user of the device executing process 400. In one embodiment, process 400 presents a user interface (UI) dialog that indicates that another device wishes to send the file via the ad hoc file sharing service to the user of the device executing process 400. In addition, in this embodiment, by accepting the file transfer request, the file sharing connection is established between the two devices. For example in one embodiment, process 400 presents UI user interface dialog that indicates the name of the file and the user associated with the device wishing to send a file to the receiving device.

At block 412, process 400 determines if that request was accepted or if the request is not accepted. If the request is not accepted, at block 414, process 400 denies the request. In one embodiment process 400 transmits a message, return code, or other type of indicator to the device wishing to send the file that the file transfer request has been denied. If the request is accepted at block 412, process 400 receives the file at block 406. Execution of process 400 proceeds to block 408 described below.

If at block 404, process 400 determines that a file sharing connection was established with the device requesting to send the file, at block 406, process 400 receives the file. At block 408, process 400 stores the file in the file repository that is used for the ad hoc file sharing service. For example and in one embodiment, process 400 stores the received file in the ad hoc file repository 108A-C as described above in FIG. 1.

Figure 4B:
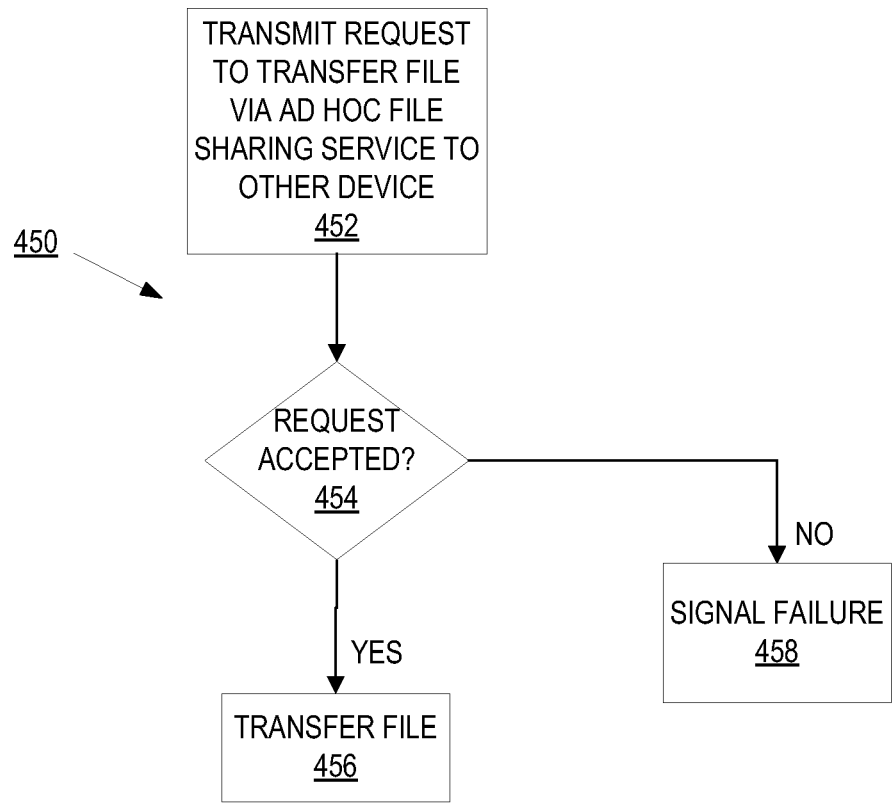

FIG. 4B is a flow diagram of one embodiment of a process 450 to send a file using the ad hoc file sharing service. In FIG. 4B, process 450 begins by transmitting a request to send a file to another device via the ad hoc file sharing service at block 452. In one embodiment, process 450 sends the request using an HTTPS request that includes the name of the file and an identification of the user wishing to send a file. In one embodiment, the identification can be an email address, social network identification, outside service identification (e.g., Twitter identification, Apple ID, MobileMe ID, or some other known service identification, etc.), etc. Furthermore, in one embodiment, the identification can be hash of the identification listed above (e.g., Secure Hash Algorithm (SHA)-1, etc.).

At block 454, process 450 determines if the transmit has been accepted. For example and in one embodiment, process 450 determines if the transfer request was accepted based on a response from the other device (e.g., return code, response message, etc.). If the request was not accepted, at block 458, process 450 does not transfer the file. If the request was accepted at block 454, at block 456, process 450 transfers the file.

Figure 5A:
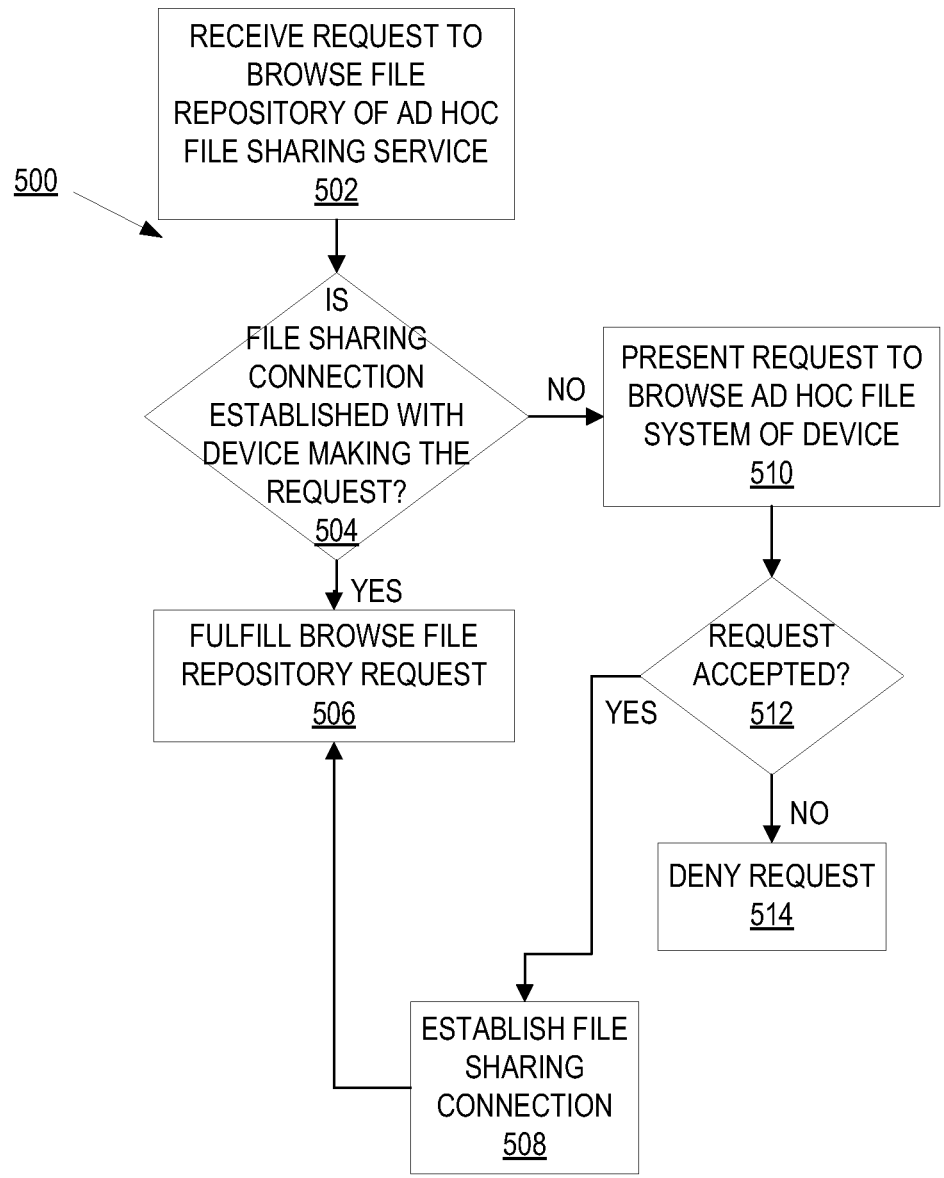
FIGS. 5A and 5B are flow diagrams of one embodiment of processes to browse files using the ad hoc file sharing service.

As described above, the ad hoc file sharing service allows user to transfer files as well as browse files on a remote device that are visible via the ad hoc file sharing service. FIG. 5AB are flow diagrams of one embodiment of process 500 to browse files using the ad hoc file sharing service. FIG. 5A is a flow diagram of one embodiment of a process 500 to allow file browsing using the ad hoc file sharing service. FIG. 5A begins by process 500 receiving a file browse request from an ad hoc file sharing service at block 502. In one embodiment, process 500 receives HTTPS request to browse for files to the device that is executing process 500. Alternatively, process 500 can receive another type request (FTP, HTTP, etc.). For example and in one embodiment, a process 500 receives an HTTPS request that includes an identification of the file directory to be browsed, (optionally) any filters that should be applied to file list, and/or an identification of a sending device that wishes to browse for file(s). As described above, the identification can be an email address, social network identification, outside service identification (e.g., Twitter identification, Apple ID, MobileMe ID, or some other known service identification, etc.), and/or a hash of such an identification, etc. In one embodiment, the file filter included in the file browse request is a filter that limits the results of the files and/or directories returned to the list of files and/or directories that match the filter. For example and in one embodiment, a filter could be one that limits the list of files and/or directories to a list of files and/or directories matching the filter "*.exe". Alternatively, there could be no file filter in the browse file request.

At block 504, process 500 determines if there is a file sharing connection established with the device requesting to browse the file. As described above, a file sharing connection for a first device is established when the user of a first device has allowed another user of another device to send or browse files. By establishing this file sharing connection between the two devices, the point-to-point nature of the file sharing is established. In this embodiment, once the initial user has given permission to the other user to access the ad hoc file sharing service of the first device, the other user can view, retrieve, and/or send files to the first device. In one embodiment, process 500 looks up the identification associated with the ad hoc file sharing service as described in FIG. 4, block 404 above.

If process 500 has determined that no file sharing connection has been established with the device requesting to send the file, at block 510, process 500 presents the request to receive the file browse request to the user of the device executing process 500. In one embodiment, process 500 presents a user interface (UI) dialog that indicates that another device wishes to browse the user's ad hoc file sharing repository via the ad hoc file sharing service to the user of the device executing process 500. In addition, in this embodiment, by accepting the file browsing request, the file sharing connection is established between the two devices. For example in one embodiment, process 500 presents UI user interface dialog that indicates the user associated with the device wishing to browse the file sharing repository of the receiving device.

At block 512, process 500 determines if that request was accepted or if the request is not accepted. If the request is not accepted, at block 514, process 500 denies the request. In one embodiment process 500 transmits a message, return code, or other type of indicator to the device wishing to browse the file sharing repository that the file browse request has been denied. If the request is accepted at block 512, process 500 fulfills the file browsing request at block 506. In one embodiment, process 500 fulfills the file browsing request by assembling a list of files and/or directories that meet the criteria in (if any) file filters present in the file browsing request and transmits this list to the device that originally made the file browse request.

If at block 504, process 500 determines that a file sharing connection was established with the device requesting to send the file, at block 506, process 500 fulfills the file browsing request as described above.

Figure 5B:
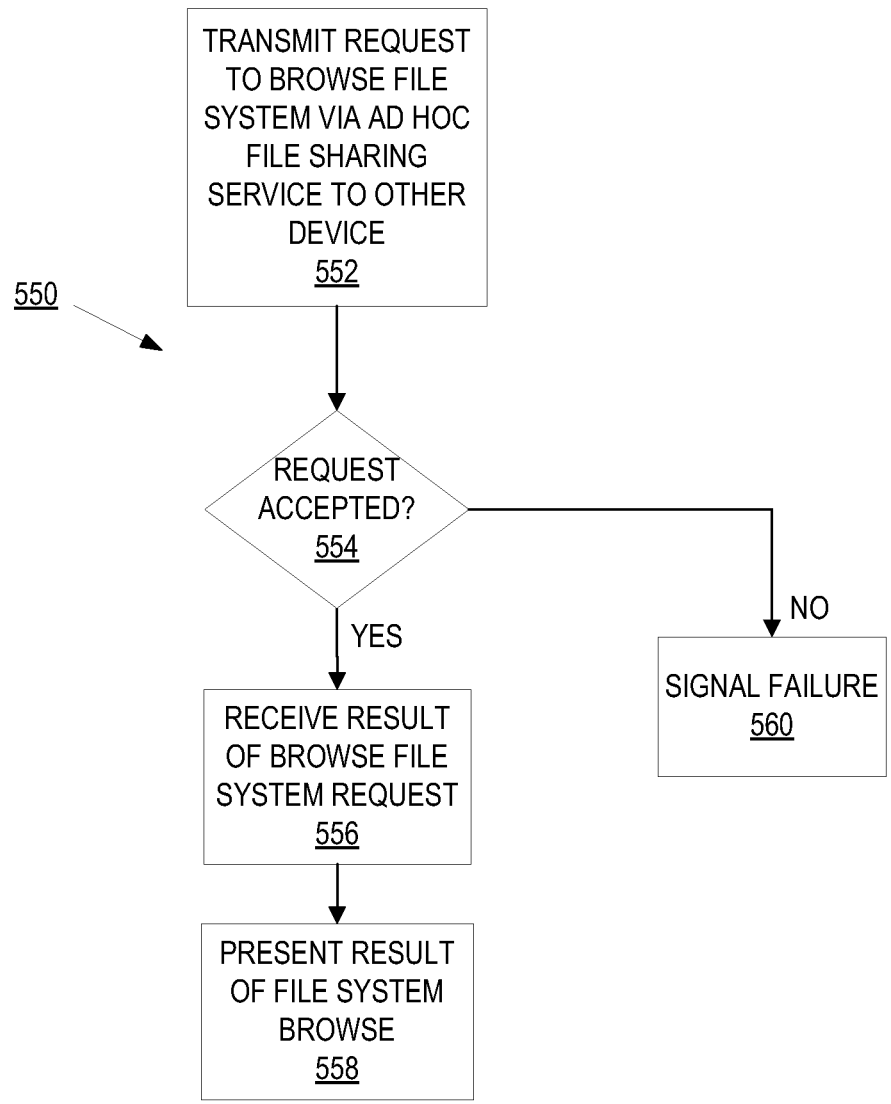

FIG. 5B is a flow diagram of one embodiment of a process 550 to transmit a file browse request using the ad hoc file sharing service. In FIG. 5B, process 550 begins by transmitting a file browse request to another device via the ad hoc file sharing service at block 552. In one embodiment, process sends the request using an HTTPS request that includes the name of the file, an identification of the user wishing to send a file, and, optionally a file filter. In one embodiment, the identification can be an email address, social network identification, outside service identification (e.g., Twitter identification, Apple ID, MobileMe ID, or some other known service identification, etc.), etc. Furthermore, in one embodiment, the identification can be hash of the identification listed above (e.g., Secure Hash Algorithm (SHA)-1, etc.).

At block 554, process 550 determines if the file browse has been accepted. For example and in one embodiment, process 550 determines if the file browse request was accepted based on a response from the other device (e.g., return code, response message, etc.). If the request was not accepted, at block 560, process 550 signals a failure (e.g., presents a user interface dialog, etc.). If the request was accepted at block 554, process 500 receives the results of the file browse request as described with referent to FIG. 5, block 556.

At block 558, process 500 presents the result of the file system browse. In one embodiment, process 500 updates a UI that illustrates the contents of the ad hoc file sharing repository of the other device. For example and in one embodiment, process 550 updates a files display portion of a UI as described in FIG. 6 below.

Figure 6:
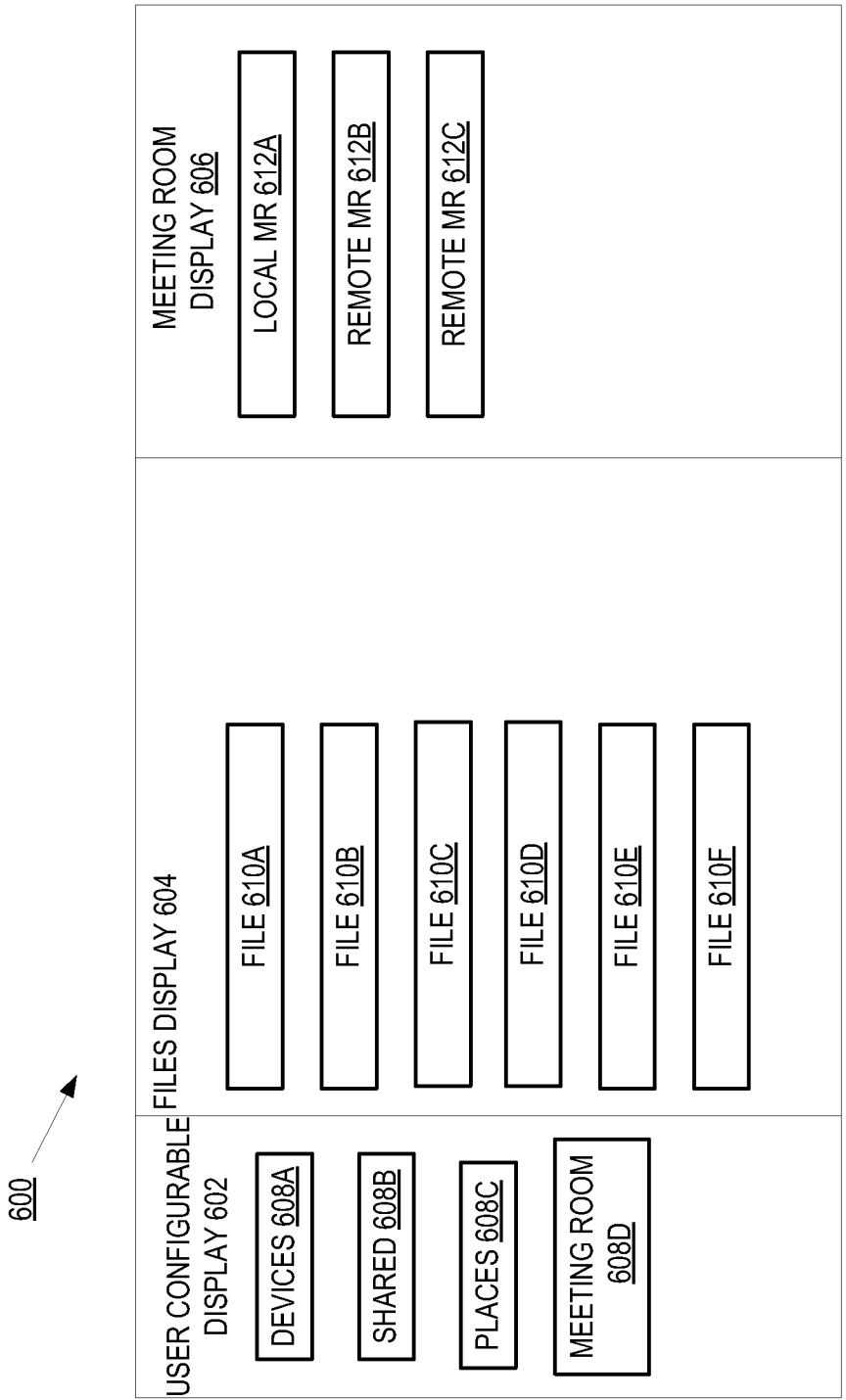
FIG. 6 is a block diagram of a file sharing user interface illustrating file sharing and browsing with the ad hoc file sharing service.

FIG. 6 is a block diagram of a file sharing UI 600 illustrating file sharing and browsing with the ad hoc file sharing service. In FIG. 6, file sharing UI 600 includes three separate portions of the UI to display different entities, a user configurable display 602, a files display 604, and a meeting room display 606. The user configurable portion 602 includes one UI icons that represent devices 608A, shared 608B, places 608C, and meeting room 608D. In one embodiment, the one or more icons for the devices 608A can include UI icons for a list of one or more devices attached to the device that is displaying the UI (e.g, hard disks, removable storage, printers, etc. and/or other attachable devices known it the art). Furthermore, in one embodiment, the shared display 608B can include one or icons representing different shared devices for the device displaying the UI (e.g., other computers, network attached peripherals, etc., and/or other network accessible device as known in the art). In one embodiment, places display 608C represents directories that commonly used by the user of the device displaying the UI (e.g., desktop, applications, documents, movies, photos, music, pictures, etc. and/or other user-configurable directories).

In one embodiment, meeting room 608D is a set of one or more icons representing the ad hoc file sharing service of the device that is presenting the UI 600. In one embodiment, when one of the icons in the meeting room 608D is clicked on, the files and/or directories in the ad hoc file sharing repository are listed in the files display 604. The files and/or directories can be listed in any manner known in the art, e.g., alphabetically, sorted by date, sorted by size, represented with different icons, filtered to show some of the files and/or directories, etc. and/or a combination therein.

Furthermore, in FIG. 6, meeting room display 606 includes different meeting rooms 612A-C that are available for the device that is presenting UI display 600. In one embodiment, each meeting room 612A-C represents an ad hoc file sharing service on one or more devices. In one embodiment, there can be multiple concurrent ad hoc file sharing services on one device. For example and in one embodiment, For example, there could be two graphical user sessions (e.g., by using Fast User Switching available to the device) and each user could be in Meeting Room in each session. In this case, one user could use the console at a time, so only one could interact with the other user and accept/reject/send the file. Another embodiment with multiple users could be using screen sharing with a virtual screen. In this embodiment, there would be two concurrent instances of Meeting Room on the device.

For example and in one embodiment, local meeting room 612 is an icon that represents the ad hoc file sharing service on the device that is presenting the UI 600. Furthermore, in this example, remote meeting rooms 612B-C are icons that represent ad hoc file sharing services on remote device(s) that are coupled to the device that presents the UI 600. For example and in one embodiment, if device 102A is presenting the UI 600, local meeting room 612A represents the ad hoc file sharing service on device 102A, and remote meeting rooms 612B-C represent the ad hoc file sharing services on devices 612B-C, repressively.

In one embodiment, a user can add files and/or directories to the ad hoc file sharing service by dragging and dropping the files onto the files display 604 and/or the icon for local meeting room 612A. Furthermore, in one embodiment, one or more files and/or directories can be transferred to the remote ad hoc filing systems by dropping the one or more files and/or directories onto the desired remote meeting room icon (e.g., meeting room 612B-C). In one embodiment, to browse files in a remote ad hoc file sharing repository, a user can click on the icon representing the remote ad hoc file sharing service of interest, e.g., meeting room 612B or C. In this embodiment, by clicking on meeting room 612B or C, the list of files and/or directories in the corresponding ad hoc file repository 108B or C is displayed in the files display 604. For example and in one embodiment, by clicking on meeting room 612B which corresponds to device 102B, the list of files and/or directories in the ad hoc file repository are displayed. While in one embodiment, all of the files and/or directories in that ad hoc file sharing repository are listed, in alternate embodiments, some of the files and/or directories are listed (e.g., filtered using file filters as known in the art, displayed as organized by directory, sorted in various ways known in the art, etc.).

In one embodiment, a user of a device can bring one or more files and/or directories to a local device from a remote device by dragging and dropping the desired files from a remote ad hoc file sharing service to the local device. For example and in one embodiment, a user can drag and drop one or more files from the files display 604 that is displaying remotely available files on a remote device's ad hoc file sharing service and drop those selected files onto the desktop of the user's local device. This has the effect of transferring those selected files from the remote device's ad hoc file sharing repository to the desktop of the user's device.

Figure 7:
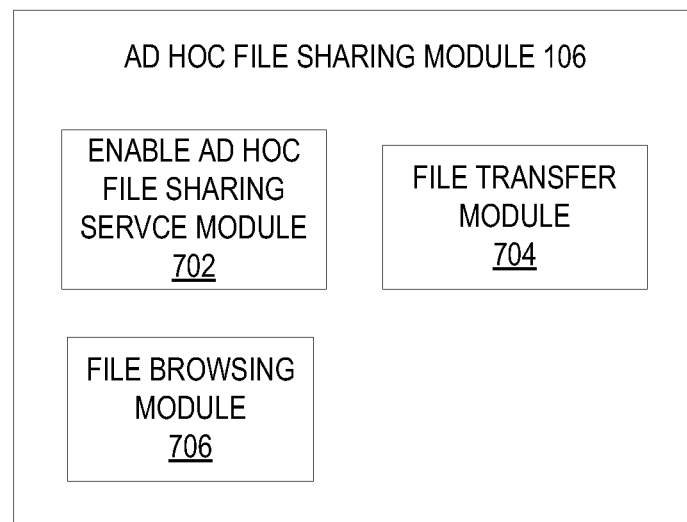
FIG. 7 is a block diagram of an ad hoc file sharing module that performs ad hoc file sharing.

FIG. 7 is a block diagram of an ad hoc file sharing module 106 that performs ad hoc file sharing. In one embodiment, ad hoc file sharing modules 106A-C use ad hoc file sharing module 106. In FIG. 7, the ad hoc file sharing module 106 includes enable ad hoc file sharing service module 702, file sharing module 704, and file browsing module 706. In one embodiment, the enable ad hoc file sharing service module 702 enables the ad hoc file sharing service as described in FIG. 2, block 202 above. The file sharing module 704 transfer files using the ad hoc file sharing service as described in FIG. 2, block 204 above. The file browsing module 706 browses for files and/or directories using the ad hoc file sharing service as described in FIG. 2, block 202 above.

Figure 8A:
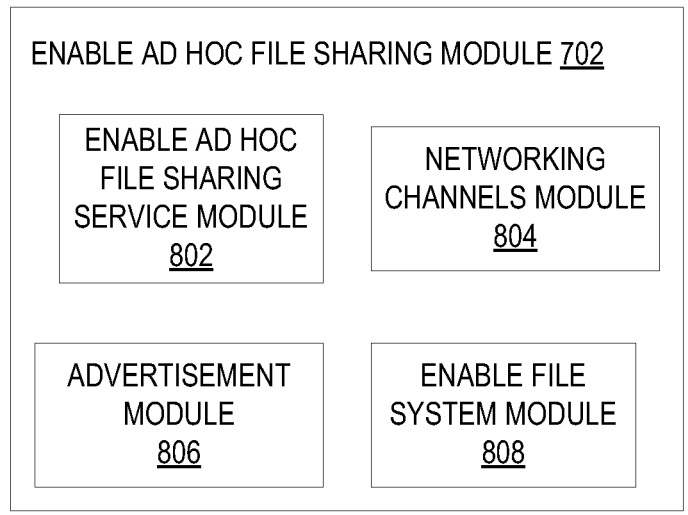
FIG. 8A is a block diagram of an enable ad hoc file sharing module that enables and advertises an ad hoc file sharing service.

FIG. 8A is a block diagram of an enable ad hoc file sharing module 702 that enables and advertises an ad hoc file sharing service. In FIG. 8A, enable ad hoc file sharing module 702 includes enable ad hoc file sharing service module 802, networking channels module 804, advertisement module 806, and enable file repository module 808. The enable ad hoc file sharing service module 802 enables the ad hoc file sharing service as described in FIG. 3A, block 302 above. The networking channels module 804 brings up networking channels as needed as described in FIG. 3A, block 304 above. The advertisement module 806 advertises the availability of the ad hoc file sharing service as described in FIG. 3A, block 306 above. The enable file repository 808 enables the ad file sharing repository as described in FIG. 3A, block 302 above.

Figure 8B:
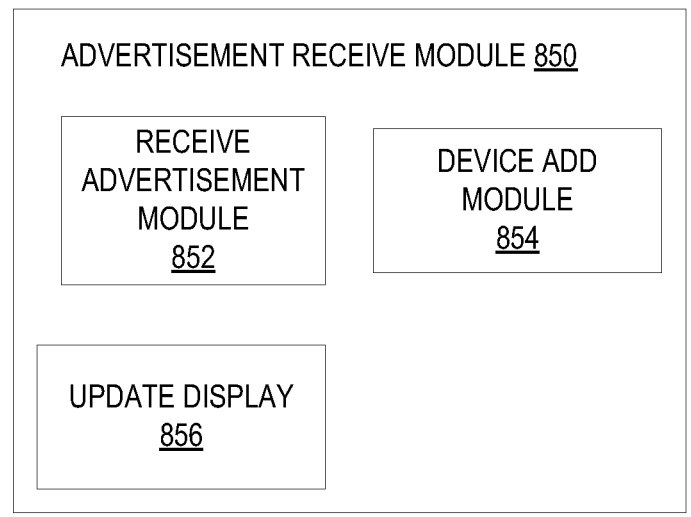
FIG. 8B is a block diagram of an advertisement receive module that receives advertisements for ad hoc file sharing service.

FIG. 8B is a block diagram of an advertisement receive module 850 that receives advertisements for ad hoc file sharing service. In FIG. 8B, the advertisement receive module 850 includes receive advertisement module 852, device add module 854, and update display 856. The receive advertisement module 852 receives ad hoc file sharing advertisements as described in FIG. 3B, block 352 above. The device add module 854 adds a device to a list of known ad hoc file sharing service(s) that are available as described in FIG. 3B, block 354 above. The update display 856 updates the display of the availability of the ad hoc file sharing service(s) as described in FIG. 3B, block 358 above.

Figure 9A:
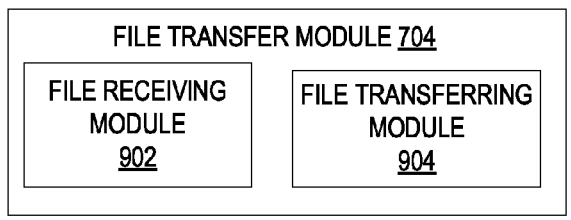
FIGS. 9A, 9B, and 9C are block diagrams of file transfer modules that transfer files using the ad hoc file sharing service.

FIG. 9ABC are block diagrams of file transfer modules that transfer files using the ad hoc file sharing service. FIG. 9A is a block diagram of a file transfer module 704 that transfers files. In FIG. 9A, file transfer module 704 includes file receiving module 902 and file transferring module 904. The file receiving module 902 receives files as described in FIG. 5A above. The file transferring module 904 transfers files as described in FIG. 5B above.

Figure 9B:
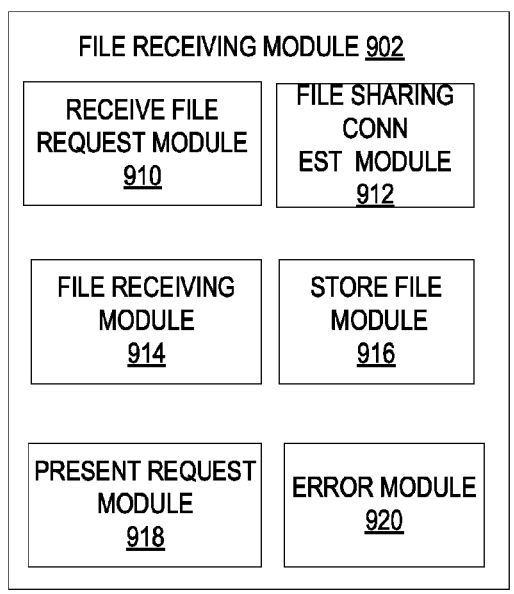

FIG. 9B is a block diagram of a file receiving module 902 that receives files. In FIG. 9B, file receiving module 902 includes receive file request module 910, file sharing connection establish module 912, file receiving module 914, store file module 916, present request module 918, and error module 920. The receive file request module 910 receives the file transfer request as described in FIG. 4A, block 402 above. The file sharing connection establish module 912 establishes the file sharing connections as described in FIG. 4A, block 416 above. The file receiving module 914 receives the file as described in FIG. 4A, block 406 above. The store file module 916 stores the file in the ad hoc file repository as described in FIG. 4A, block 408 above. The present request module 918 presents the request to receive the file as described in FIG. 4A, block 410 above. The error module 920 denies the file transfer request as described in FIG. 4A, block 414 above.

Figure 9C:
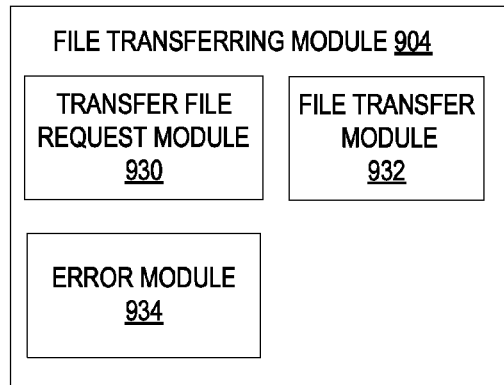

FIG. 9C is a block diagram of a file transferring module 904 that transmits files. In FIG. 9B, file transferring module 902 includes transfer file request module 930, file transfer module 932, and error module 934. The transfer file request module 930 transfers the file transfer request as described in FIG. 4A, block 452 above. The file transfer module 932 transmits the file as described in FIG. 4A, block 456 above. The error module 934 denies the file transfer request as described in FIG. 4A, block 468 above.

FIG. 10ABC are block diagrams of file browsing modules that browse files using the ad hoc file sharing service. FIG. 10A is a block diagram of a file browsing module 706 that browses files using the ad hoc file sharing service. In FIG. 10A, file browsing module 706 includes receive file browsing module 1002 and get file browsing module 1004. The receive file browsing module 1002 responds to remote browsing requests as described in FIG. 5A above. The get file browsing module 1004 browses remote computers as described in FIG. 5B above.

FIG. 10B is a block diagram of the receive file browsing module 1002 that responds to remote browsing requests using the ad hoc file sharing service. In FIG. 10B, receive file browsing module 1002 includes receive file browsing request module 1010, file sharing connection establish module 1012, fulfill file browsing module 1014, present file browsing module 1016, and deny request 1018. The receive file browsing request module 1010 receives the file browsing request as described in FIG. 5A, block 502 above. The file sharing connection establish module 1012 establishes the file sharing connection as described in FIG. 5A, block 508 above. The fulfill file browsing module 1014 fulfills the file sharing browse file repository as described in FIG. 5A, block 506 above. The present file browsing module 1016 presents the file browsing request as described in FIG. 5A, block 510 above. The deny request 1018 denies the file browsing request as described in FIG. 5A, block 514 above.

FIG. 10C is a block diagram of the get file browsing module 1002 that browses remote computers using the ad hoc file sharing service. In FIG. 10B, get file browsing module 1002 includes transmit file browsing request module 1030, receive browsing result module 1032, present file browsing module 1032, and error module 1036. The transmit file browsing request module 1030 transmits the file browsing request as described in FIG. 5B, block 552 above. The receive file browsing request module 1030 transmits the file browsing request as described in FIG. 5B, block 556 above. The present file browsing module 1034 presents the file browsing result as described in FIG. 5B, block 558 above. The error module 1018 denies the file browsing request as described in FIG. 5A, block 560 above.

Figure 11:
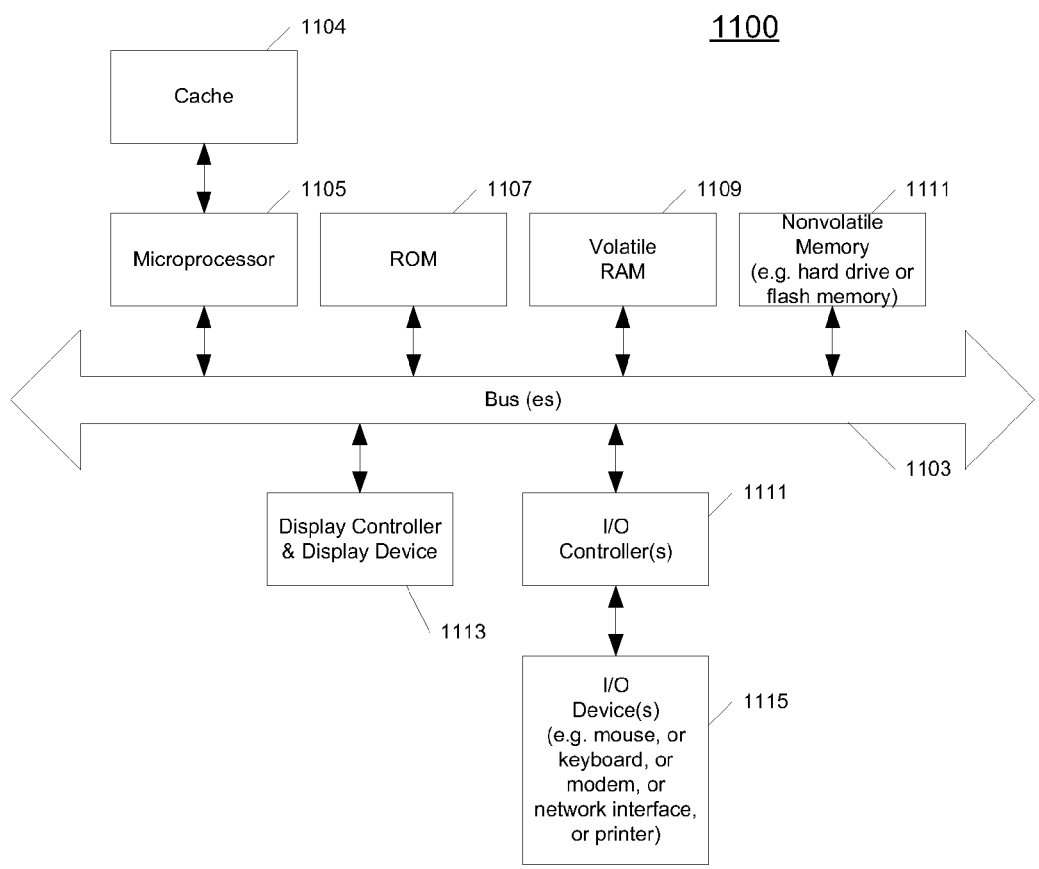
FIG. 11 illustrates one example of a typical computer system which may be used in conjunction with the embodiments described herein.

FIG. 11 shows one example of a data processing system 1100, which may be used with one embodiment of the present invention. For example, the system 1100 may be implemented including a host as shown in FIG. 1. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices which have fewer components or perhaps more components may also be used with the present invention.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1113 and to peripheral devices such as input/output (I/O) devices which may be mice, keyboards, modems, network interfaces, printers and other devices which are well known in the art. Typically, the input/output devices 1115 are coupled to the system through input/output controllers 1117. The volatile RAM (Random Access Memory) 1109 is typically implemented as dynamic RAM (DRAM) which requires power continually in order to refresh or maintain the data in the memory.

The mass storage 1111 is typically a magnetic hard drive or a magnetic optical drive or an optical drive or a DVD RAM or a flash memory or other types of memory systems which maintain data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Figure 12:
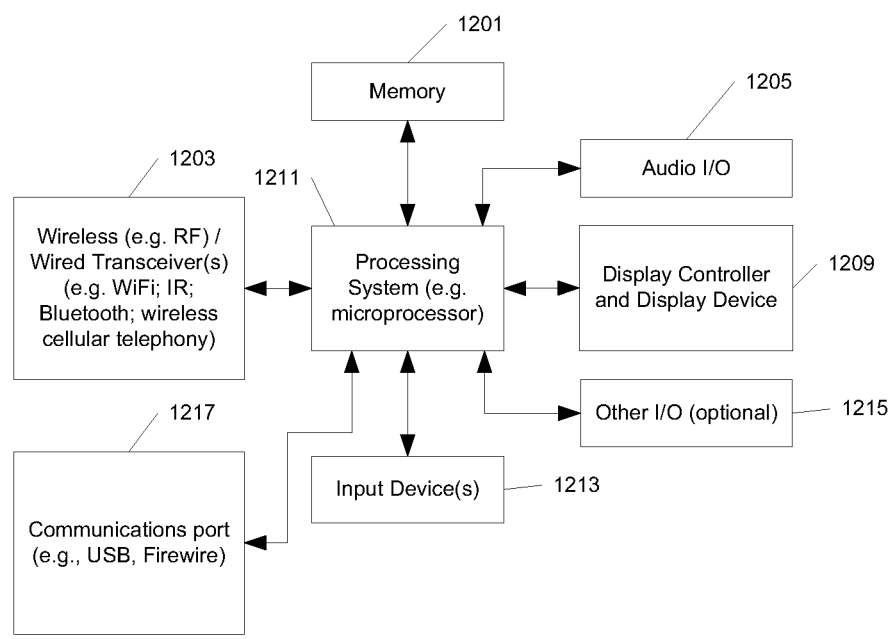
FIG. 12 shows an example of a data processing system which may be used with one embodiment of the present invention.

FIG. 12 shows an example of another data processing system 1200 which may be used with one embodiment of the present invention. For example, system 1200 may be implemented as a portable storage device as shown in FIG. 1. The data processing system 1200 shown in FIG. 12 includes a processing system 1211, which may be one or more microprocessors, or which may be a system on a chip integrated circuit, and the system also includes memory 1201 for storing data and programs for execution by the processing system. The system 1200 also includes an audio input/output subsystem 1205 which may include a microphone and a speaker for, for example, playing back music or providing telephone functionality through the speaker and microphone.

A display controller and display device 1209 provide a visual user interface for the user; this digital interface may include a graphical user interface which is similar to that shown on a Macintosh computer when running OS X operating system software, or Apple iPhone when running the iOS operating system, etc. The system 1200 also includes one or more wireless transceivers 1203 to communicate with another data processing system, such as the system 1200 of FIG. 12. A wireless transceiver may be a WLAN transceiver, an infrared transceiver, a Bluetooth transceiver, and/or a wireless cellular telephony transceiver. It will be appreciated that additional components, not shown, may also be part of the system 1200 in certain embodiments, and in certain embodiments fewer components than shown in FIG. 12 may also be used in a data processing system. The system 1200 further includes one or more communications ports 1217 to communicate with another data processing system, such as the system 1500 of FIG. 15. The communications port may be a USB port, Firewire port, Bluetooth interface, etc.

The data processing system 1200 also includes one or more input devices 1213 which are provided to allow a user to provide input to the system. These input devices may be a keypad or a keyboard or a touch panel or a multi touch panel. The data processing system 1200 also includes an optional input/output device 1215 which may be a connector for a dock. It will be appreciated that one or more buses, not shown, may be used to interconnect the various components as is well known in the art. The data processing system shown in FIG. 12 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1200 may be a network computer or an embedded processing device within another device, or other types of data processing systems which have fewer components or perhaps more components than that shown in FIG. 12.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "computing," "selecting," "presenting," "determining," "associating," "transmitting," "storing," "receiving," "establishing," "transferring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method of transferring files between a first device and one or more other devices, the method comprising:
    placing one or more files in one or more special-purpose folders associated with an ad hoc file sharing service on the first device, the ad hoc file sharing service configured to automatically make files placed in the special-purpose folder available for sharing using the ad hoc file sharing service;
    activating the ad hoc file sharing service, wherein the first device has an active network connection to a network that couples the first device to the network and the network is coupled to the one or more other devices;
    in response to the activating the ad hoc file sharing service, transmitting, with the first device, an advertisement packet of the ad hoc file sharing service to each of the other devices via the active network connection, wherein the advertisement packet advertises the existence of the ad hoc file sharing service to each of the other devices, wherein the advertisement packet includes a user identity of the user associated with the first device, and wherein access to the ad hoc file sharing service is granted on a per-user basis and is accomplished without the user corresponding to the other device having a file sharing account on the first device;
    establishing the file sharing connection with each of the other devices; and,
    transferring files with each of the other devices using the established file sharing connection, the transferring comprising making files that have been placed in the one or more special-purpose folders available for transfer.

2. The non-transitory machine-readable medium of claim 1, wherein the establishing the connection for the each of the other devices comprises:
    presenting a user identification of a user corresponding to that other device to the user of the first device; and
    allowing access to the ad file sharing service to the user corresponding to that other device.

3. The non-transitory machine-readable medium of claim 2, wherein the access to the ad hoc file sharing service is accomplished without using an authentication service on another device that is not the first device or one of the other devices.

4. The non-transitory machine-readable medium of claim 2, wherein the access to the ad hoc file sharing service is accomplished without the user corresponding to that other device having to log into the ad hoc file sharing service.

5. The non-transitory machine-readable medium of claim 1, wherein the method further comprises:
    establishing a file repository for the ad hoc file sharing service, the file repository comprising the one or more special-purpose folders.

6. The non-transitory machine-readable medium of claim 5, wherein the file repository comprises one or more directories.

7. The non-transitory machine-readable medium of claim 1, wherein the method further comprises:
    fulfilling a file browsing request from one of the other devices.

8. A non-transitory machine-readable medium having executable instructions to cause one or more processing units to perform a method of transferring files between a first device and one or more other devices, the method comprising:
    placing one or more files in one or more special-purpose folders associated with an ad hoc file sharing service on the first device, the ad hoc file sharing service configured to automatically make files placed in the special-purpose folder available for access using the ad hoc file sharing service;
    activating the ad hoc file sharing service, wherein the first device has an active network connection to a network that couples the first device to the network and the network is coupled to the one or more other devices;
    in response to the activating the ad hoc file sharing service, transmitting, with the first device, an advertisement packet of an ad hoc file sharing service to each of the other devices via the active network connection, wherein the advertisement packet advertises the existence of the ad hoc file sharing service to each of the other devices, and the advertisement packet includes a user identity of the user associated with the first device; and
    allowing access to the ad hoc file sharing service to each of the other devices, wherein the access to the ad hoc file sharing service is granted on a per-user basis and the access is accomplished without a user corresponding to the each of the other devices having a file sharing account on the first device, and wherein the access comprises making files that have been placed in the one or more special-purpose folders available for access.

9. The non-transitory machine-readable medium of claim 8, wherein the access to the ad hoc file sharing service is accomplished without the user corresponding to that other device having a file sharing account.

10. The non-transitory machine-readable medium of claim 8, wherein the access to the ad hoc file sharing service is accomplished without an authentication service using another device that is not the first device nor one of the other devices.

11. The non-transitory machine-readable medium of claim 8, wherein the access to the ad hoc file sharing service is accomplished without the user corresponding to that other device having to log into the ad hoc file sharing service.

12. The non-transitory machine-readable medium of claim 8, wherein the method further comprises:
    establishing a file repository for the ad hoc file sharing service, the file repository comprising the one or more special-purpose folders.

13. The non-transitory machine-readable medium of claim 12, wherein the file repository comprises one or more directories.

14. The non-transitory machine-readable medium of claim 8, wherein the method further comprises:
    fulfilling a file browsing request from one of the other devices.

15. An apparatus comprising:
means for placing one or more files in one or more special-purpose folders associated with an ad hoc file sharing service on the first device, the ad hoc file sharing service configured to automatically make files placed in the special-purpose folder available for sharing using the ad hoc file sharing service;
means for activating the ad hoc file sharing service, wherein the first device has an active network connection to a network that couples the first device to the network and the network is coupled to the one or more other devices;
in response to the activating the ad hoc file sharing service,
means for transmitting an advertisement packet of an ad hoc file sharing service to each of one or more other devices, wherein the means for advertisement packet advertises the existence of the ad hoc file sharing service to each of the other devices via the active network connection, the advertisement packet includes a user identity of the user associated with the first device and, access to the ad hoc file sharing service is granted on a per-user basis and is accomplished without the user corresponding to that other device having a file sharing account on the first device;
means for establishing file sharing connection with each of the other devices;
means for transferring files with each of the other devices using the established file sharing connection, the transferring comprising making files that have been placed in the one or more special-purpose folders available for transfer.

16. The apparatus of claim 15, wherein the means for establishing the connection for the each of the other devices comprises:
means for presenting a user identification of a user corresponding to that other device to the user of the first device; and
means for allowing access to the ad file sharing service to the user corresponding to that other device.

17. A non-transitory machine-readable medium having executable instructions to cause one or more processing units to perform a method of an ad hoc file sharing process that is used to transfer files between a first device and one or more other devices, the method comprising:
placing one or more files in one or more special-purpose folders associated with an ad hoc file sharing service on the first device, the ad hoc file sharing service configured to automatically make files placed in the special-purpose folder available for access using the ad hoc file sharing service;
in response to a user selecting one of the one or more special-purpose folders,
activating, on the first device, the ad hoc file sharing process, wherein the first device has an active network connection to a network that couples the first device to the network and the network is coupled to the one or more other devices;
in response to the activating the ad hoc file sharing process, transmitting, with the first device, an advertisement packet of an ad hoc file sharing service to each of the other devices, wherein the advertisement packet advertises the existence of the ad hoc file sharing service to each of the other devices via the active network connection, the advertisement packet includes a user identity of the user associated with the first device, access to the ad hoc file sharing service is granted on a per-user basis, and the access is accomplished without a user corresponding to the each of the other devices having a file sharing account on the first device; and
allowing access to the ad hoc file sharing service to each of the other devices, wherein the access comprises making files that have been placed in the one or more special-purpose folders available for access.

18. The non-transitory machine-readable medium of claim 1, wherein the user identity is selected from the group consisting of an email address, an AppleID, a social network identification, a hash of the such an identifier, a number used as a key, a readable name, a universally unique identifier (UUID), a certificate fingerprint, a telephone number, and a list of identifiers known for the user.

19. The non-transitory machine-readable medium of claim 8, wherein the user identity is selected from the group consisting of an email address, an AppleID, a social network identification, a hash of the such an identifier, a number used as a key, a readable name, a universally unique identifier (UUID), a certificate fingerprint, a telephone number, and a list of identifiers known for the user.

20. The apparatus of claim 15, wherein the user identity is selected from the group consisting of an email address, an AppleID, a social network identification, a hash of the such an identifier, a number used as a key, a readable name, a universally unique identifier (UUID), a certificate fingerprint, a telephone number, and a list of identifiers known for the user.

21. The non-transitory machine-readable medium of claim 17, wherein the user identity is selected from the group consisting of an email address, an AppleID, a social network identification, a hash of the such an identifier, a number used as a key, a readable name, a universally unique identifier (UUID), a certificate fingerprint, a telephone number, and a list of identifiers known for the user.

* * * * *